United States Patent [19]

Kizu et al.

[11] Patent Number: 5,267,092

[45] Date of Patent: Nov. 30, 1993

[54] EDITING APPARATUS FOR SEQUENTIALLY REPRODUCING INFORMATION SIGNALS FROM A PLURALITY OF RECORDED MEDIA AND RECORDING THE REPRODUCED SIGNALS ON A RECORDING MEDIA IN ACCORDANCE WITH PREDETERMINED EDITING DATA

[75] Inventors: Sojiro Kizu; Yutaka Saito; Akira Kikuchi; Ichiro Ninomiya, all of Kanagawa, Japan

[73] Assignee: Sony Corporation, Tokyo, Japan

[21] Appl. No.: 671,443

[22] Filed: Mar. 19, 1991

[30] Foreign Application Priority Data

Mar. 22, 1990 [JP] Japan .................. 2-72554

[51] Int. Cl.$^5$ ............................................. G11B 27/02
[52] U.S. Cl. ..................................... 360/14.1; 360/69; 360/13
[58] Field of Search ................ 360/13, 15, 69, 71, 360/14.1, 92; 358/183, 311

[56] References Cited

U.S. PATENT DOCUMENTS

| | | | |
|---|---|---|---|
| 3,938,190 | 2/1976 | Semmlow et al. | 360/71 |
| 4,351,007 | 9/1982 | Youngquist | 360/13 |
| 4,425,586 | 1/1984 | Miller | 358/335 |
| 4,426,684 | 1/1984 | Sechet et al. | 360/13 |
| 4,528,600 | 7/1985 | Ishiguro et al. | 360/14.1 |
| 4,685,003 | 8/1987 | Wetland | 360/14.1 |
| 4,774,600 | 9/1988 | Baumeister | 360/14.1 |
| 4,779,151 | 10/1988 | Lind et al. | 360/137 X |
| 4,794,467 | 12/1988 | Okuyama et al. | 360/15 |

FOREIGN PATENT DOCUMENTS 2911615 3/1979 European Pat. Off. .
0377474 7/1990 European Pat. Off. .

Primary Examiner—Andrew L. Sniezek
Attorney, Agent, or Firm—William S. Frommer; Alvin Sinderbrand

[57] ABSTRACT

An editing apparatus has a storage unit in which a plurality of recorded media, such as, tape cassettes, are stored at respective storage positions, a first memory for storing data identifying the recorded media in the storage unit and data representing the respective storage positions thereof, a playback device for reproducing information signals from recorded media at a loaded position therein, a recording device for recording on a recording medium, such as, another tape cassette, the information signals reproduced by the playback device, a second memory for storing the data identifying the recorded media loaded in the playback device, a transport device for carrying the recorded media between the respective storage positions in the storage unit and the loaded position in the playback device with the data stored in the first and second memories being updated in response to operations of the transport device, and a control system by which operations of the transport device are controlled in accordance with input editing data and the data stored in the first and second memories.

7 Claims, 2 Drawing Sheets

EDITING APPARATUS FOR SEQUENTIALLY REPRODUCING INFORMATION SIGNALS FROM A PLURALITY OF RECORDED MEDIA AND RECORDING THE REPRODUCED SIGNALS ON A RECORDING MEDIA IN ACCORDANCE WITH PREDETERMINED EDITING DATA

BACKGROUND OF THE INVENTION

1. Field of the Invention

The present invention relates to an editing apparatus for sequentially reproducing information signals from a plurality of recording media and recording the reproduced signals on a predetermined recording medium, and more particularly to an editing apparatus capable of automatically loading and ejecting the recording media in and from playback units.

2. Description of the Prior Art

In the conventional editing apparatus known heretofore, it is generally customary that desired cuts are spliced to one another in accordance with a prepared editing data list.

In an editing operation, therefore, the desired cuts to be edited are sequentially selected by previously monitoring tape cassettes to prepare an editing data list which sequentially includes identification numbers (hereinafter referred to as reel numbers) of tape cassettes relative to the individual cuts, and also time codes representative of in-points and out-points.

After preparation of such editing data list, tape cassettes are loaded in an editing video tape recorder for the individual cuts in accordance with the editing data list, and the individual cuts are dubbed. Such conventional editing apparatus is disclosed in, for example, U.S. Pat. No. 4,528,600.

When an editing data list is prepared in the editing operation mentioned above, it is necessary to repeat the procedure of loading and ejecting the tape cassettes many times.

In editing desired cuts, procedure of properly loading and ejecting the tape cassettes needs to be repeated without any mistake in accordance with the prepared editing data list.

OBJECT AND SUMMARY OF THE INVENTION

It is therefore an object of the present invention to provide an improved editing apparatus which is capable of eliminating the manual recording-media loading and ejecting procedure performed usually by an operator, so as to enhance the efficiency in an editing operation.

More specifically it is an object of the present invention to provide an editing apparatus for sequentially reproducing information signals from a plurality of recording media and recording the reproduced signals on a recording medium in accordance with predetermined editing data. In accordance with aspect of the present invention, an editing apparatus comprises a recording-media array or storage means for arraying or storing therein a plurality of recording media; a first memory means for storing identification data of the recording media in the recording-media array means and also array position data of the recording media in the array means; playback means for playing back the recording media to reproduce the information signals therefrom; a recording means for recording on a recording medium the information signals reproduced by the playback means; a second memory means for storing identification data of the recording media loaded in the playback means; a recording media carrier means for carrying selected recording media from the array means and loading the selected recording media in the playback means; a data renewal means for renewing the identification data stored in the first and second memory means in response to the operation of the recording-media carrier means; and a control means for controlling the carrier means in accordance with the editing data, the data stored in the first memory means and the data stored in the second memory means in such a manner that the selected recording media are carried to the playback means.

The above and other features and advantages of the present invention will become apparent from the following description which will be given with reference to the illustrative accompanying drawings.

DESCRIPTION OF A PREFERRED EMBODIMENT

Figure 1:
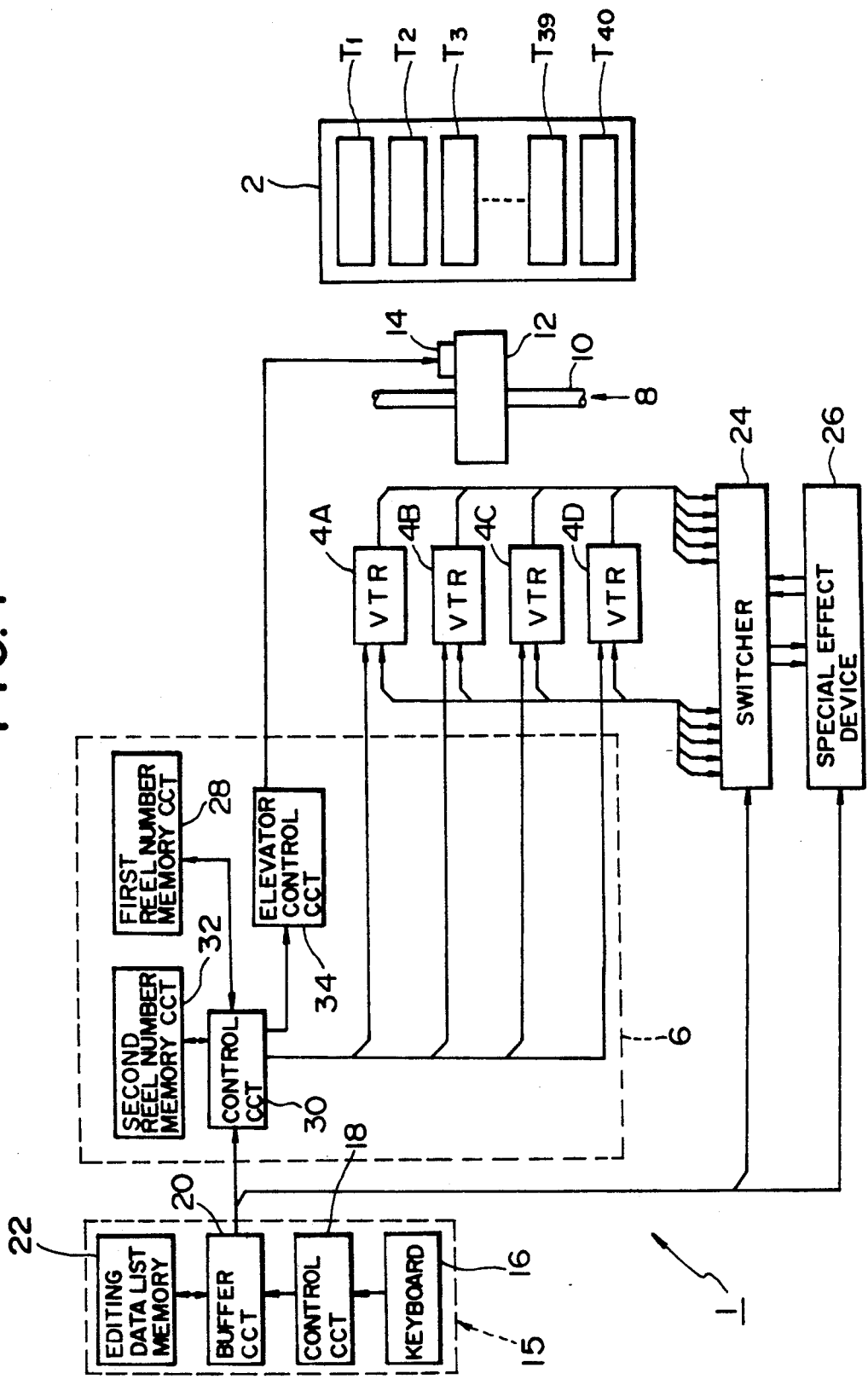
FIG. 1 is a block diagram of an exemplary editing apparatus according to an embodiment of the present invention.

FIG. 1 shows the overall arrangement of an editing apparatus 1, in which a plurality of tape cassettes are arrayed or stored in a shelf or storage unit 2.

The shelf unit 2 consists of 40 horizontal shelves T1, T2, ..., T39, T40 arranged vertically one above the other, and 16 tape cassettes to be edited are arrayed or positioned on each of such shelves T1-T40.

Four video tape recorders (VTRs) 4A, 4B, 4C, 4D are vertically superposed adjacent the shelf unit 2 and are driven in accordance with control data outputted from a shelf controller 6.

A cassette carrier 8 is disposed between the shelf unit 2 and the video tape recorders 4A-4D so that tape cassettes can be carried between the shelves T1-T40 and the video tape recorders 4A-4D in accordance with the control data outputted from the shelf controller 6. Thus, the tape cassettes arrayed or stored on the shelves T1-T40 are loaded in the video tape recorders 4A-4D as required, or the tape cassettes ejected from the video tape recorders 4A-4D are returned to predetermined positions on the shelves T1-T40.

The cassette carrier 8 has a guide member 10 movable horizontally between the shelf unit 2 and the video tape recorders 4A-4D, and an elevator 12 is shiftable upward and downward while being guided by the guide member 10, so that the elevator 12 can be brought to any desired position of the shelves T1-T40 and the video tape recorders 4A-4D.

The elevator 12 is equipped with, an actuator (not shown) for transferring tape cassette to and from the elevator 12, and an actuator motor 14 is driven in response to the control data outputted from the shelf controller 6, whereby the tape cassettes taken out from the shelves T1-T40 or from the video tape recorders 4A-4D are loaded in the video tape recorders 4A-4D or are arrayed on the shelves T1-T40 by operation of the cassette carrier 8.

An editor 15 receives input data at a control circuit 18 thereof from a keyboard 16 and supplies the input data, when required, via a buffer circuit 20 to an editing-data list memory circuit 22, the shelf controller 6, a switcher 24 and a special effect device 26.

More specifically, at the start of an editing operation, reel number data and tape-cassette array position data inputted by operation of the keyboard 16 are supplied to the shelf controller 6, whereby the data representing the reel numbers and the array positions of the tape cassettes in the shelf unit 2 are stored in a first memory circuit 28 included in the shelf controller 6 and which stores data identifying the numbers of the reels or cassettes stored at the various array positions or locations in the shelf unit 2.

At the time of preparing an editing data list, the reel number data inputted via the keyboard 16 are supplied to the shelf controller 6, and the control data inputted successively are supplied to the shelf controller 6, the switcher 24 and the special effect device 26.

In this stage, in-points and out-points are designated together with the predetermined control data, and time codes including such in-points and out-points are stored in the editing data list memory circuit 22 together with the reel number data and the control data supplied to the shelf controller 6, the switcher 24 and the special effect device 26, whereby to sequentially prepare an editing data list.

When desired cuts are, to be edited, the editing data stored in the editing data list memory circuit 22 are sequentially read out therefrom and then are supplied to the shelf controller 6, the switcher 24 and the special effect device 26.

The switcher 24 switches its operation in accordance with the control data obtained from the editor 15 to thereby select video signals outputted from the video tape recorders 4A-4D and the special effect device 26, and then supplies the selected video signals to the video tape recorders 4A-4D and the special effect device 26.

The special effect device 26 switches its operation in accordance with the control data outputted from the editor 15 and adds a special effect to the video signals received from the switcher 24.

Meantime in the shelf controller 6, the control data outputted from the editor 15 are received at a control circuit 30, and the tape cassettes in the video tape recorders 4A-4D are replaced while the operations of the video tape recorders 4A-4D are selectively switched in accordance with the control data.

More specifically, at the start of the editing operation, the control circuit 30 receives the output data from the editor 15 and then stores the data sequentially in the first memory circuit 28, whereby the reel numbers of the tape cassettes arrayed in the shelf unit 2 are sequentially stored together with the tape-cassette array position data.

Meanwhile at the time of preparing an editing data list, the control circuit 30 causes the cassette carrier to take out tape cassettes from the shelves T1-T40 in accordance with the control, data received from the editor 15 and then causes loading of the tape cassettes in designated one of the video tape recorders 4A-4D, whereby the procedure of loading and ejecting the tape cassettes by the operator can be eliminated in the preparation of the editing data list.

More specifically, the control circuit 30 searches a second memory circuit 32 which stores data identifying the numbers of the reels or cassettes situated in the several video tape recorders (VTRs) 4A-4D, and makes a decision as to whether the tape cassette of each input reel number is already loaded or not in any of the video tape recorders 4A-4D.

Then the memory circuit 32 stores therein individually the reel numbers of the tape cassettes loaded in the video tape recorders 4A-4D.

Thus, after searching the memory circuit 32, the control circuit 30 is capable of making a decision as to whether the tape cassette of each input reel number is already loaded or not in any of the video tape recorders 4A-4D.

Subsequently, in case the tape cassette of the input reel number is present in one of the video tape recorders 4A-4D, the control circuit 30 supplies control data to the video tape recorders 4A-4D in accordance with the input control data received successively.

Then the operator manipulates the keyboard 16 to play back the tape cassettes loaded in the video tape recorders 4A-4D, and therefore can prepare an editing data list by sequentially setting in-points, out-points and so forth.

On the contrary, in the event that the tape cassette corresponding to an input reel number is not loaded in any of the video tape recorders 4A-4D, the control circuit 30 searches the first memory circuit 28 and drives the tape cassette carrier 8 in accordance with the result of such search.

Namely, the control data are supplied to the elevator control circuit 34 in accordance with the result of the above search, and the desired tape cassettes arrayed in the shelf unit 2 are loaded in the designated video tape recorders 4A-4D.

If undesired tape cassettes remain in the designated video tape recorders 4A-4D, the control circuit 30 supplies the control data to the video tape recorders 4A-4D, so that the tape cassettes are ejected therefrom and, after return of such preceding tape cassettes to the former positions on the shelves T1-T40, the desired tape cassettes of the input reel numbers are loaded.

Subsequently the control circuit 30 renews the contents of both the memory circuit 28 and the second memory circuit 32 to reflect the respositioning of the tape cassettes, and then supplies the required control data to the video tape recorders 4A-4D in accordance with the control data inputted.

Meanwhile in case any input reel number is not stored in the first memory circuit 28 either, the control circuit 30 displays on a predetermined monitor a message which signifies that the desired tape cassette is not present in the shelf unit 2, and control circuit 30 then waits for input of subsequent control data.

At this stage, the operator needs merely to manipulate the keyboard 16 in order to direct that the desired tape cassette taken out from the shelf unit 2 be loaded in the designated one of the video tape recorders 4A-4D. When necessary, the operator repeats playback of the tape cassettes by manipulating the keyboard 16 and thereby sets in-points, out-points and so forth to prepare an editing data list.

As a consequence, in preparing an editing data list, it is possible to eliminate the procedure of loading and ejecting the tape cassettes by the operator, hence enhancing the editing efficiency.

When the editing data list is inputted subsequently to supply the control data at the start of the editing operation, the control circuit 30 searches the second memory circuit 32 and makes a decision as to whether the tape cassette of each input reel number is already loaded in any of the video tape recorders 4A-4D.

In case the tape cassette of the input reel number is present in the video tape recorders 4A-4D, the required control data is supplied to the video tape recorders 4A-4D in accordance with the editing data list, and after a special effect if any, is added by the special effect device 26 to predetermined cuts when necessary, such cuts are sequentially recorded on the tape cassettes loaded in the selected video tape recorders 4A-4D.

If the tape cassettes of the input reel numbers are not present in the video tape recorders 4A-4D, the control circuit 30 searches the first memory circuit 28 and, according to the result of such search, causes loading of the desired tape cassettes, which are arrayed in the shelf unit 2, into designated ones of the video tape recorders 4B-4D in accordance with the editing data list.

If previously used, but now undesired tape cassettes are remain in the designated video tape recorders 4B-4D, the control circuit 30 causes such tape cassettes to be injected therefrom and returned to the former positions on the shelves T1-T40.

Subsequently the control circuit 30 renews the contents of both the first memory circuit 28 and the second memory circuit 32 in response to the repositioning of the tape cassettes, and then supplies the required control data to the video tape recorders 4A-4D in accordance with the editing data list.

Thereafter desired cuts are recorded on the tape cassette loaded in designated ones of the video tape recorders, 4A for example, and then a subsequent editing data list is inputted.

Thus, the operator needs merely to manipulate the keyboard 16 to input an editing start command, whereby the tape cassettes arrayed in the shelf unit 2 are played back in accordance with the editing data list, and predetermined cuts can be recorded on the tape cassettes loaded in the desired video tape recorders 4A-4D, hence eliminating the tape-cassette loading and ejecting procedure by the operator. Consequently, editing efficiency is enhanced.

Furthermore, the editing apparatus can be driven automatically without the necessity of any operator attending thereto.

In this embodiment, the shelf unit 2 serves as a recording-media array means for storing a plurality of recording media therein, and the first memory circuit 38 serves as a memory for storing both identification data of the recording media arrayed in the recording-media array means and also array position data of the recording media in the array means.

Further the video tape recorders 4A-4D serve as playback means for playing back the recording media, and the second memory circuit 32 serves as a memory for storing the identification data of the recording media loaded in the playback means.

Besides the above, the tape cassette carrier 8 serves as a recording-media carrier means for carrying the recording media from the array means and loading the same in the playback means. The control circuit 30 serves as a data renewal means for renewing the identification data stored in the first and second data memory circuits 28 and 32 in response to the action of the recording-media carrier means At the time of preparing an editing data list, the reel number of a tape cassette is input via the keyboard 16, so that the second memory circuit 32 is searched, and a decision is made as to whether or not the selected cassette input reel number video tape recorders 4A-4D.

If the result of such decision indicates that the tape cassette is not already loaded in any of the video tape recorders 4A-4D, the first memory circuit 28 is then searched to detect the position of the selected tape cassette on the shelves of the shelf unit 2. In accordance with the result of such detection, the desired tape cassette is then carried from the shelf unit 2 by the carrier means 8 and loaded into the desired one of the video tape recorders 4A-4D. Thus, it is possible to eliminate the need for manual loading and ejecting of the tape cassettes by an operator and the operator can prepare an editing data list merely by manipulating the keyboard 16 to input in-points, out-points and so forth.

When desired cuts are edited, the memory circuit 32 is searched in accordance with the editing data list output from the editing data list memory circuit 22, and a decision is made as to whether the tape cassette is already loaded or not in any of the video tape recorders 4A-4D.

If the result of such decision indicates that the tape cassette is not already loaded in any of the video tape recorders 4A-4D, the first memory circuit 28 is searched to detect the position of the selected tape cassette on the shelves of the shelf unit 2. Thereafter the selected tape cassette is carried from the shelf unit 2 in accordance with the result of such search and then is loaded in the designated one of the video tape recorders 4A-4D.

Thus, automatic sequential editing of desired cuts on the basis of the editing data list, can be achieved.

In the above described procedure, the first memory circuit 28 is searched after a search of the second memory circuit 32, then the selected tape cassette is carried from the shelf unit 2 in accordance with the result of such search and is loaded into the designated one of video tape recorder. Therefore, when preparing an editing data list and then actually editing the desired cuts, the procedure of manually loading and ejecting the tape cassettes by the operator can be eliminated to eventually enhance the operational efficiency.

The above embodiment is so contrived that, when preparing an editing data list and actually editing desired cuts, the relevant tape cassette 4 is carried from the shelf unit 2 and is loaded in accordance with the result of searching the first memory circuit 28. However, the present invention is not limited to such example alone, and the procedure of carrying the tape cassette from the shelf unit 2 and loading the same into the designated one of the video tape recorder may be executed either in preparing an editing data list or in editing desired cuts.

Although the above embodiment has been described with reference to an exemplary case of inputting the identification data and the array position data of tape cassettes by means of the keyboard 16, the present invention is not limited thereto alone, and a modification may be so devised that identification data are assigned to individual tape cassettes and, after the tape cassettes are stored in the shelf unit, the identification data are read out and inputted automatically.

Figure 2:
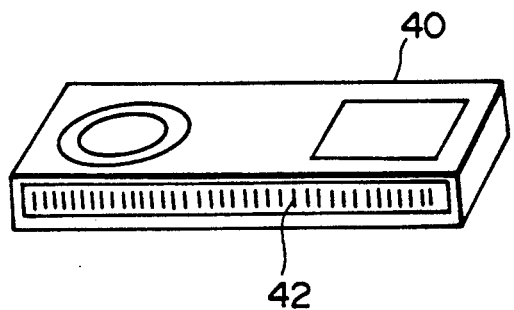
FIG. 2 is a perspective view of a tape cassette applicable to the editing apparatus embodying the present invention.

In such modification, as illustrated in FIG. 2, a bar code 42 is attached to the back surface of a tape cassette 40, and a bar code reader is provided on the elevator 12. The result of a detection of the bar code 42 by the bar code reader is stored in the first memory circuit 28 with respect to each array position in the shelf unit 2.

In this case, the bar code reader serves as an identification data reading means.

Relative to the time codes assigned to individual tape cassettes, the time-representing digits thereof may be set to mutually different values. In this example, the time-representing digits of the time codes are read out by the video tape recorders 4A-4D for detection of the identification data which are represented by the time codes and, in such case, the video tape recorders 4A-4D can serve as the identification data reading means.

It is also possible to record the identification data by utilizing a user's bit of each time code.

The embodiment described above is concerned with an exemplary case of editing tape cassettes. However, it is to be understood that the present invention is not limited thereto alone and is widely applicable to editing of recorded information on a variety of video signal recording media such as video discs, and also to the editing of music programs and so forth.

As described hereinabove, according to the present invention, recording media are arrayed in a recording-media array means, and both identification data and array position data of the recording media are retrieved in accordance with an editing data list. Subsequently the recording media in the array means are taken out therefrom in accordance with the result of such retrieval and then are loaded in playback means so as to be edited. Thus, the procedure of loading and ejecting the recording media by the operator can be eliminated to consequently enhance the editing efficiency.

Also according to the present invention, recording media are arrayed in a recording-media array means, and both identification data and array position data of such recording media are retrieved in accordance with input data. And the recording media in the array means are loaded in playback means in accordance with the result of such retrieval, so that in preparing an editing data list, the tape-cassette loading and ejecting procedure by the operator can be eliminated to eventually enhance the editing efficiency.

Further, since the identification data read out by the identification data reading means are stored in the first data memory means, the procedure of inputting the identification data can be simplified to consequently enhance the editing efficiency.

What is claimed is:

1. An editing apparatus for sequentially reproducing information signals from a plurality of first recording media and for recording the reproduced signals on a second recording medium in accordance with predetermined editing data, comprising:
   recording media storage means having a plurality of storage positions for removably storing therein a respective plurality of said first recording media having information signals recorded thereon;
   first memory means for storing identification data which identify the first recording media in said storage means and also position data indicative of said positions of the respective first recording media in said storage means;
   playback means for reproducing the information signals from said first recording media when loaded therein;
   recording means for recording on a second recording medium the information signals being reproduced by said playback means;
   second memory means for storing said identification data of the recording media loaded in said playback means;
   carrier means operative for carrying selected ones of said first recording media from said storage means and loading the selected first recording media in said playback means, and for removing said first recording media from said playback means and returning the removed first recording media to said respective positions in said storage means;
   data renewal means for renewing the identification data stored in said first and second memory means in accordance with operations of said carrier means;
   means for providing editing data identifying a desired sequence of said information signals to be reproduced from a selected plurality of said first recording media by said playback means and then recorded in said desired sequence on said second recording medium by said recording means; and
   control means for controlling said carrier means in accordance with said editing data and the data stored in said first and second memory means.

2. An editing apparatus according to claim 1, wherein said editing data represent reel numbers in-points and out-points.

3. An editing apparatus according to claim 1, further comprising special effect generating means for applying a special effect to the information signal reproduced by said playback means and providing a resulting processed signal to said recording means.

4. An editing apparatus according to claim 1, wherein said playback means include a plurality of playback units.

5. An editing apparatus according to clam 4, further comprising switching means for selectively supplying to said recording means an output signal of a selected one of said playback units.

6. An editing apparatus according to claim 1, wherein the identification data to be stored in said first memory means are recorded additionally on the respective recording media.

7. An editing apparatus for sequentially reproducing information signals from a plurality of first recording media and for recording the reproduced signals on a second recording medium in accordance with predetermined editing data, said apparatus comprising:
   recording media storage means having a plurality of storage positions for removably storing therein a respective plurality of said first recording media having information signals recorded thereon;
   first memory means for storing identification data which identify the first recording media in said storage means and also position data indicative of said positions of the respective first recording media in said storage means;
   playback means for reproducing the information signals from said first recording media when loaded therein;
   recording means for recording on a second recording medium the information signals being reproduced by said playback means;
   second memory means for storing said identification data of the recording media loaded in said playback means;
   carrier means operative for carrying selected ones of said first recording media from said storage means and loading the selected first recording media in said playback means, and for removing said first recording media from said playback means and returning the removed first recording media to said respective positions in said storage means;

data renewal means for renewing the identification data stored in said first and second memory means in accordance with operations of said carrier means;

means for providing editing data identifying a desired sequence of said information signals to be reproduced from a selected plurality of said first recording media by said playback means and then recorded in said desired sequence on said second recording medium by said recording means; and control means for controlling said carrier means by searching said second memory means for identification data of a recording medium designated by said editing data and, upon detection that the identification data of the recording medium designated by the editing data is absent from said second memory means, searching said first memory means for the position data corresponding to the recording medium designated by the editing data and then controlling said carrier means in accordance with said position data obtained by searching said first memory means.

* * * * *